United States Patent [19]

Kitzing et al.

[11] 4,233,399
[45] Nov. 11, 1980

[54] PHOTOGRAPHIC ELEMENTS CONTAINING AMINO-SUBSTITUTED HYDROXY-PYRIDONES

[75] Inventors: Rainer Kitzing, Ingatestone; John G. V. Scott, Chelmsford; Terence C. Webb, Witham; Graham Evans, Galleywood, all of England

[73] Assignee: Ciba-Geigy Aktiengesellschaft, Basel, Switzerland

[21] Appl. No.: 37,071

[22] Filed: May 8, 1979

Related U.S. Application Data

[62] Division of Ser. No. 879,425, Feb. 21, 1978, Pat. No. 4,182,886.

[30] Foreign Application Priority Data

Mar. 3, 1977 [GB] United Kingdom ............... 8924/77

[51] Int. Cl.² .............................................. G03C 1/84
[52] U.S. Cl. ................................... 430/510; 430/376; 430/467; 430/513; 430/517; 430/518; 430/522; 430/558
[58] Field of Search ............... 430/510, 513, 517, 518, 430/522

[56] References Cited

U.S. PATENT DOCUMENTS

| 2,203,659 | 6/1940 | Sheppard et al. | 430/522 |
|---|---|---|---|
| 3,018,177 | 1/1962 | Geiger et al. | 430/517 |
| 3,314,794 | 4/1967 | Sawdey | 430/517 |
| 3,469,985 | 9/1969 | Bailey et al. | 430/522 |
| 4,127,413 | 11/1978 | Ishihara et al. | 430/510 |

*Primary Examiner*—J. Travis Brown
*Attorney, Agent, or Firm*—Sprung, Felfe, Horn, Lynch & Kramer

[57] ABSTRACT

Pyridone dyestuffs of the formula

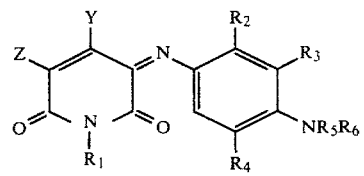

are provided wherein $R_1$ is hydrogen or an optionally substituted alkyl, aralkyl, cycloalkyl, aryl or heterocyclic radical or an optionally substituted amino group, $R_2$, $R_3$, $R_4$ each independently represent hydrogen, halogen, alkoxy, or optionally substituted alkyl or cycloalkyl, $R_5$ and $R_6$ each independently represent hydrogen or an optionally substituted alkyl, aralkyl, cycloalkyl, aryl or heterocyclic radical or $R_5$ and $R_6$, $R_3$ and $R_5$ and $R_4$ and $R_6$ form heterocyclic rings, Y is hydrogen or hydroxy, —CN, —COOR₇, —CONR₇R₈ or —COR₇ or an optionally substituted alkyl, aralkyl, cycloalkyl, aryl or heterocyclic radical, and Z represents —CN, —COOR₉, —CONR₉R₁₀, —SO₃H, —SO₃⊖ or —COR₉, where $R_7$, $R_8$, $R_9$ and $R_{10}$ each independently represent hydrogen or an optionally substituted alkyl, aralkyl, cycloalkyl, aryl or heterocyclic radical.

The dyestuffs can be used e.g. as cyan image dyestuffs in photographic material, as diffusible dyes which may become mordanted in a receptor layer or as filter, antihalation or acutance dyes in photographic material.

11 Claims, No Drawings

PHOTOGRAPHIC ELEMENTS CONTAINING AMINO-SUBSTITUTED HYDROXY-PYRIDONES

This is a division, of application Ser. No. 879,425 filed Feb. 21, 1978, now U.S. Pat. No. 4,182,886.

This invention relates to novel dyestuffs, to their production and to their use in photographic materials.

According to the present invention there are provided dyestuffs to the formula

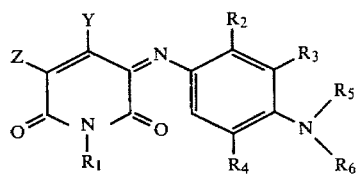

wherein
- $R_1$ is hydrogen or an optionally substituted alkyl, aralkyl, cycloalkyl, aryl or heterocyclic radical or an optionally substituted amino group,
- $R_2$, $R_3$, $R_4$ each independently represent hydrogen, halogen, alkoxy, or optionally substituted alkyl or cycloalkyl and $R_5$ and $R_6$ each independently represent hydrogen, or an optionally substituted alkyl, aralkyl, cycloalkyl, aryl or heterocyclic radical or $R_5$ and $R_6$ together with the nitrogen atom to which they are attached form a 5- or 6-membered nitrogen containing heterocyclic ring, or $R_3$ and $R_5$ together form with the nitrogen atom a 5- or 6-membered nitrogen containing heterocyclic ring, or $R_4$ and $R_6$ together form with the nitrogen atom a 5- or 6-membered nitrogen containing heterocyclic ring, or $R_3$ and $R_5$ together with the nitrogen atom and $R_5$ and $R_6$ together with the nitrogen atom form two nitrogen containing heterocyclic rings,
- Y is hydrogen or hydroxy, —CN, —COOR$_7$, —CONR$_7$R$_8$ or —COR$_7$ or an optionally substituted alkyl, aralkyl, cycloalkyl, aryl or heterocyclic radical, and
- Z is —CN, —COOR$_9$, —CONR$_9$R$_{10}$, —SO$_3$H, —SO$_3^\ominus$ or —COR$_9$ group, where $R_7$, $R_8$, $R_9$ and $R_{10}$ each independently represent hydrogen or an optionally substituted alkyl, aralkyl, cycloalkyl, aryl or heterocyclic radical.

Throughout the specification the terms lower alkyl and lower alkoxy are used to denote alkyl or alkoxy radicals respectively containing from 1 to 6 carbon atoms.

The optionally substituted alkyl radicals represented by Y, $R_1$ to $R_{10}$ are preferably lower alkyl groups or substituted lower alkyl radicals, and as specific examples of such radicals there may be mentioned methyl, ethyl, n-propyl, n-butyl, n-octyl, n-decyl and n-dodecyl, hydroxy lower alkyl such as β-hydroxymethyl, lower alkoxy alkyl with 1 to 6 carbon atoms in the alkoxy and alkyl radical such as β-(methoxy or ethoxy)-ethyl and γ-methoxypropyl, cyano lower alkyl such as cyanomethyl, carbamoylmethyl, carbethoxymethyl, and acetylmethyl.

As examples of aralkyl radicals represented by Y, $R_1$ and $R_3$ to $R_{10}$ there may be mentioned benzyl and β-phenyl ethyl.

As an example of a cycloalkyl radical represented by Y and $R_1$ to $R_{10}$ there may be mentioned cyclohexyl.

The optionally substituted aryl radicals represented by Y, $R_1$ and $R_5$ to $R_{10}$ are preferably phenyl or optionally substituted phenyl radicals, and as specific examples of such radicals there may be mentioned phenyl, tolyl, chlorophenyl, methoxyphenyl and ethoxyphenyl. The optionally substituted heterocyclic radicals represented by Y, $R_1$ and $R_5$ to $R_{10}$ are preferably 5- and 6-membered heterocyclic rings and as specific examples of such radicals there may be mentioned 2-pyridyl, 2-thiazolyl, 1-piperidinyl and 1-morpholinyl, each of which may be substituted.

As examples of 5- and 6-membered heterocyclic rings formed by joining $R_5$ and $R_6$ and the nitrogen atom, or $R_3$ and $R_5$ and the nitrogen atom, or $R_4$ and $R_6$ and the nitrogen atom, there may be mentioned piperidine, morpholine, piperazine and pyrrolidine.

Z is preferably —CN, —COOR$_{11}$ or —CONR$_{11}$R$_{12}$ wherein $R_{11}$ and $R_{12}$ are hydrogen or alkyl of 1 to 3 carbon atoms.

Of special interest are further dyestuffs of formula (1), wherein $R_1$ is hydrogen, alkyl of 1 to 6 carbon atoms, hydroxyalkyl of 1 to 6 carbon atoms, alkoxyalkyl of 1 to 6 carbon atoms each in the alkyl and the alkoxy radical, phenyl, benzyl, β-phenylethyl or cyclohexyl, $R_2$ is hydrogen, chloro, alkyl, hydroxyalkyl or alkoxy each of 1 to 6 carbon atoms, $R_3$ is hydrogen, alkyl or alkoxy of 1 to 6 carbon atoms, $R_4$ is hydrogen or alkyl of 1 to 6 carbon atoms, $R_5$ and $R_6$ are hydrogen, alkyl or hydroxyalkyl of 1 to 6 carbon atoms, alkoxyalkyl of 1 to 6 carbon atoms each in the alkyl and the alkoxy radical, carboxyalkyl with 1 to 3 carbon atoms in the alkyl radical, β-methylsulphonamidoethyl or sulpho-n-butyl, Y is hydrogen, cyano, carbmethoxy, carbethoxy, carbonamido or alkyl of 1 to 6 carbon atoms and Z is cyano, carbmethoxy, carbethoxy or carbonamido.

Preferred dyestuffs of the present invention are those of the formula

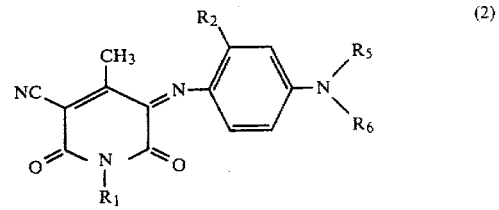

wherein $R_1$ is alkyl of 1 to 6 carbon atoms, $R_2$ is hydrogen or alkyl of 1 to 3 carbon atoms, $R_5$ and $R_6$ are alkyl of 1 to 4 carbon atoms, hydroxyalkyl of 2 to 4 carbon atoms or $R_5$ and $R_6$ together with the nitrogen atom to which they are attached are a piperidine, morpholine, piperazine or pyrrolidine ring and especially such of formula (2), wherein $R_1$ is alkyl of 1 to 6 carbon atoms, $R_2$ is hydrogen or methyl and $R_5$ and $R_6$ are ethyl or hydroxyalkyl of 2 to 4 carbon atoms.

The following single species are especially preferred: Dyestuffs of the formula

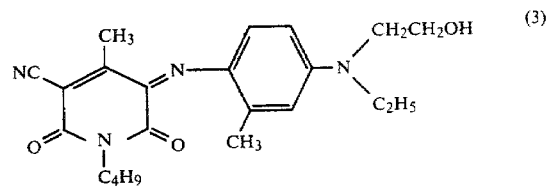

-continued

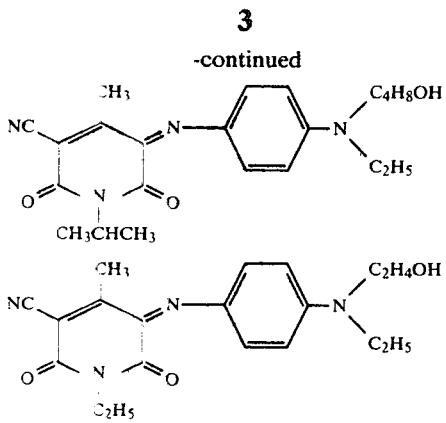

According to a further feature of the invention there is provided a process for the manufacture of the dyestuffs of formula (1) which comprises condensing a hydroxypyridone of the formula

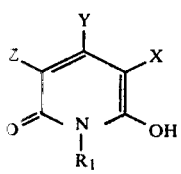

wherein Y, Z, and $R_1$ have the meanings hereinbefore stated and X is hydrogen or halogen or a coupling-off group as hereinafter defined with a colour developer of formula

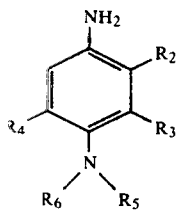

where $R_2$ to $R_6$ have the meanings hereinbefore stated, in the presence of an oxidising agent and base.

By 'coupling-off group' is meant a group present in the coupling position X which is released when the colour coupler couples with oxidised colour developing agent. A particular example of a coupling-off group is a mercapto radical.

An example of a coupling-off group is the group Q—T where Q is an oxygen or sulphur linking atom and T is an optionally substituted alkyl, aryl or heterocyclic group or where Q is a direct link and T is a group

where W represents the atoms necessary to complete a 5- or 6-membered heterocyclic ring.

As examples of oxidising agents may be mentioned ammonium persulphate, potassium ferricyanide, and silver halide.

As examples of suitable bases may be cited sodium hydroxide, potassium carbonate, and pyridine.

The hydroxypyridones of formula (6) used in the process of the invention can themselves be obtained by a number of methods such as are described for example in "Heterocyclic Compounds—Pyridine and its derivatives—Part 3" which was edited by Klinsberg and published by Interscience Publishers in 1962. See also B.P. No. 1,256,095.

The colour developers used in the process of the present invention are of the usual type employed in chromogenic photographic development such as are described for example in "The theory of the photographic process" (chapter 13) edited by Mees and James and published by MacMillan in 1966.

As specific examples of the hydroxypyridones there may be mentioned 2,6-dihydroxy-3-cyano-4-methylpyridine, 1-(methyl or ethyl)-3-cyano-4-methyl-6-hydroxy-pyrid-2-one, 1-($\beta$-hydroxyethyl or $\gamma$-methoxypropyl)-3-cyano-4-(methyl, phenyl or ethyl)-6-hydroxypyrid-2-one, 1-(phenyl, or -anisyl)-3-cyano-4-(methyl or phenyl)-6-hydroxy-pyrid-2-one, 1-phenyl-3-(carbonamido or carboethoxy)-4-(methyl or phenyl)-6-hydroxypyrid-2-one, 2,6-dihydroxy-3-(carboethoxy or carbodiethylamido)-4-methylpyridine, 2,6-dihydroxy-3-(carbonamido or carboethoxy)pyridine, 2,6-dihydroxy-3-carbonamido-4-phenylpyridine, 2,6-dihydroxy-3-cyano-4-carbonamidopyridine, 2,6-dihydroxy-3-cyano-4-(carbomethoxy or carboethoxy)pyridine, ethyl 2,6-dihydroxy-3-cyanopyrid-4-ylacetate, 2,6-dihydroxy-3-cyanopyrid-4-ylacetamide, 2,6-dihydroxy-3,4-di(carboethoxy)-pyridine, 2,6-dihydroxy-3-carbonamido-4-carboethoxy-pyridine, ethyl 2,6-dihydroxy-isonicotinate, 2,6-dihydroxy isonicotinamide, 2,6-dihydroxy isonicotinic acid diethylamide, and 2,6-dihydroxy-3-cyano-4-ethoxy-carbonyl-1-methyl-pyridine.

As specific examples of colour developers there may be mentioned:

4-Amino-2-acetamido-N,N-diethylaniline
4-Amino-2-methyl-N,N-diethylaniline
4-Amino-2-methyl-N,N-dimethylaniline
4-Amino-2,5-dimethyl-N,N-diethylaniline
N-(4-Aminophenyl)morpholine
2,4-Diamino-N,N-diethylaniline
N-(4-Aminophenyl)piperazine
N-(4-Amino-3-methylphenyl)morpholine
4-Amino-N-ethyl-N-carbamoylmethylaniline
4-Amino-2-methoxy-N,N-diethylaniline
4-Amino-3-chloro-N,N,-diethylaniline
4-Amino-3-methyl-N-ethyl-N-carbamoylmethylaniline
N-(4-Aminophenyl)piperidine
4-Amino-N-ethyl-N-($\beta$-methoxyethyl)aniline
4-Amino-N-ethyl-N-($\beta$-acetamidoethyl)aniline
4-Amino-N-ethyl-N-(N-methyl-$\beta$-methylsulphonamido-ethyl)aniline
4-Amino-N-ethyl-N-($\beta$-ethoxyethyl)aniline
N-(4-Amino-3-methylphenyl)piperidine
4-Amino-2-methoxy-5-methyl-N,N-diethylaniline
4-Amino-N,N-dimethylaniline
4-Amino-N-ethyl-N-tetrahydrofurfurylaniline
4-Amino-N-methyl-N-ethylaniline
4-Amino-N-methyl-N-($\eta$-butyl)aniline
4-Amino-N-methyl-N-($\eta$-propyl)aniline
4-Amino-3-methyl-N-ethyl-N-(N-methyl-$\beta$-methyl-sulphonamidoethyl) aniline
4-Amino-N,N-diethylaniline
4-Amino-3-methylsulphonamidoethyl-N,N-diethyl-aniline
4-Amino-N-ethyl-N-($\beta$-methylsulphonamidoethyl)aniline
4-Amino-3-hydroxymethyl-N,N-diethylaniline
4-Amino-N-ethyl-N-($\eta$-propyl)aniline 4-Amino-3-(β-acetamidoethyl)-N,N-diethylaniline
4-Amino-3-(β-hydroxyethyl)-N,N-diethylaniline
4-Amino-3-(β-aminoethyl)-N,N-diethylaniline
4-Amino-N-ethyl-N-(β-hydroxyethyl)aniline
4-Amino-N,N-di(η-propyl)aniline
4-Amino-N-ethyl-N-(β-aminoethyl)aniline
4-Amino-3-methyl-N-methyl-N-(β-methyl sulphonamidoethyl)aniline
4-Amino-3-ethyl-N,N-diethylaniline
4-Amino-3-(N-methyl-β-methylsulphonamidoethyl)-N,N-diethylaniline
1-(4-Aminophenyl)pyrrolidine
4-Amino-3-methyl-N-ethyl-N-tetrahydrofurfuryl-aniline
4-Amino-3-(β-methylsulphonamidoethyl)-N,N-diethylaniline
4-Amino-3-acetamido-N,N-diethylaniline
4-Amino-3-methyl-N-ethyl-N-(β-methylsulphonamidoethyl)aniline
4-Amino-3-methyl-N,N-diethylaniline
6-Amino-1-(β-methylsulphonamidoethyl),1,2,3,4-tetrahydroquinoline
4-Amino-3-methyl-N-ethyl-N-(β-hydroxyethyl)aniline
6-Amino-1-ethyl-,2,3,4-tetrahydroquinoline
4-Amino-3-ethoxy-N-ethyl-N-(N-methyl-β-methylsulphonamidoethyl) aniline
5-Amino-1-(β-methylsulphonamidoethyl)indoline
4-Amino-3,5-dimethyl-N,N-diethylaniline
4-Amino-3-ethoxy-N-ethyl-N-(β-methylsulphonamidoethyl)aniline
4-Amino-3-methoxy-N,N-diethylaniline
4-Amino-3-ethoxy-N,N-diethylaniline
9-Aminojulolidine
4-Amino-3-dimethylamino-N,N-diethylaniline
4-Amino-3-methylsulphonamido-N,N-diethylaniline
3,4-Diamino-N,N-diethylaniline
4-Amino-3-ethylamino-N,N-diethylaniline
4-Amino-3-hydroxy-N,N-diethylaniline The preparation of the compounds of the invention can be conveniently carried out by stirring the reactants together in water or an organic solvent such as pyridine. The resulting dyestuff can then be isolated by conventional methods.

The dyestuffs of the present invention may be used in photographic materials in a large number of different ways. For example they may be present as image dyestuffs in silver halide colour photographic material. In this case the dyestuffs are formed in situ in the photographic material as a result of the colour development process and the photographic material is in this case an exposed and processed material bearing a dye image.

The dyestuffs of the present invention find most use as filter or anti-halation dyes in which case the preformed dyes are present in the unexposed and unprocessed photographic material.

Therefore according to this aspect of the present invention there is provided light-sensitive photographic material which comprises in at least one layer thereof a dyestuff of the general formula (1). Optionally the dye in this aspect of the invention is present as an oil dispersion in a binder layer.

The dyestuff of formula (1) may be present in a resin binder as an anti-halation backing layer on the reverse side of the film base to the photo-sensitive layer.

Dyestuffs of formula (1) of particular use in antihalation backing layers have the formula (2).

A particularly useful dyestuff of formula (1) as an antihalation backing dye has the formula (3). Examples of suitable resin binders are nitrated styrene-maleic acid copolymer, styrene-methacrylic acid copolymer, vinyl acetate-crotonic acid copolymer and sulphonated polystyrene.

The dyestuff of formula (1) and especially of formula (2) may be present in an anti-halation underlayer of the photographic material that is to say between the film base and the lowest light-sensitive layer. In this case either the dye is substantive to the layer, either intrinsically or by virtue of being dissolved in an oil, but is bleached in a processing bath and the bleached residue washed out of the photographic material or the dyestuff is mordanted in the layer and the dye-mordant bond is broken in a processing solution so that the dye can be washed out of the photographic material.

Readily bleachable dyestuffs of formula (1) are those wherein Z is an electron withdrawing group such as $-CN$, $-COOR_9$, $-CONR_9R_{10}$ or $-COR_9$ where $R_9$ and $R_{10}$ have meanings given to them before and $R_1$ is an optionally substituted lower alkyl group.

Especially preferred bleachable dyestuffs correspond to formula (1), wherein Y is $CH_3$, Z is $-CN$, $-COOR_{11}$ or $-CONR_{11}R_{12}$, $R_1$ is alkyl of 1 to 6 carbon atoms, $R_2$ is hydrogen or alkyl of 1 to 3 carbon atoms, $R_3$ and $R_4$ are hydrogen and $R_5$ and $R_6$ are alkyl of 1 to 4 carbon atoms, hydroxyalkyl of 2 to 4 carbon atoms or $R_5$ and $R_6$ together with the nitrogen atom to which they are attached are a piperidine, morpholine, piperazine or pyrrolidine ring.

Dyestuffs of formula (1) which can be mordanted and which are diffusible after the mordant bond is broken are those which contain an acidic substituent group.

A particularly suitable readily bleachable dyestuff of formula (1) has the formula (4).

This dye absorbs light in the region of 400–700 nm in gelatine and thus is suitable for use in an anti-halation underlayer.

Examples of binding agents suitable when the dyes of the present invention are used as anti-halation underlayers are gelatin and gelatin derivatives.

The diffusible dyestuffs of formula (1) may also be used as acutance dyes in photographic material in which case they diffuse throughout the layers in the photographic material and absorb any stray light during exposure and thus help to increase the sharpness of the final image.

The dyestuffs of general formula (1) and especially of formula (2) may be also used as filter dyes in colloid filter layers between light sensitive layers. A dye particularly suitable for use as an oil dispersion has the formula (5). When dissolved in ditertpentylphenol and the mixture dispersed in gelatin, the combination absorbs light with Dmax 530 nm.

EXAMPLE 1

Preparation of the dye of the formula

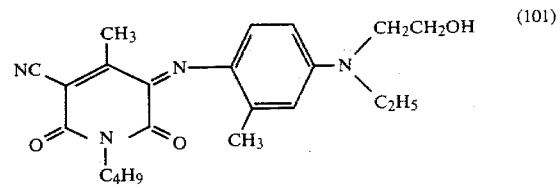

(101)

5.15 g of 1-butyl-3-cyano-6-hydroxy-4-methylpyrid-2-one in 430 ml pyridine were treated with a solution of 14.6 g of 4-amino-3-methyl-N-ethyl-N-(β-hydroxyethyl)aniline in water. 22.82 g of ammonium persulphate, in water was added, the mixture stirred and a precipitate was formed which was collected by filtration and washed with water. A slurry of the product in hot ethanol was stirred 5 minutes and the product filtered off. This procedure was repeated until no starting material showed in a chromatogramme.

The visible spectrum in methanol λ max at 665 nm with a side absorption at 414 nm.

EXAMPLE 2

Preparation of the dye of the formula

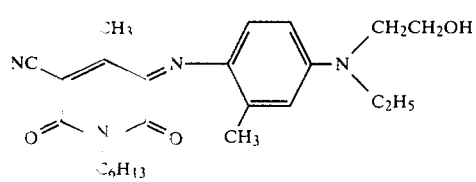
(102)

1.29 g of 1-hexyl-3-cyano-6-hydroxy-4-methyl pyrid-2-one and 2 g of sodium hydroxide were dissolved in 200 ml of water, 2.42 g of 4-amino-3-methyl-N-ethyl-N-(p-hydroxyethyl)aniline was added followed by an aqueous solution of 4.48 g of ammonium persulphate. The mixture was stirred 10 minutes. The blue gum which formed was treated with hot ethanol and the mixture poured into water. The precipitate was filtered off, and treated with hot ethanol until no starting material showed in a thin layer chromatogramme.

The visible spectrum in methanol showed λ max at 664 nm with a side absorption at 400 nm.

EXAMPLE 3

Preparation of the dye of the formula

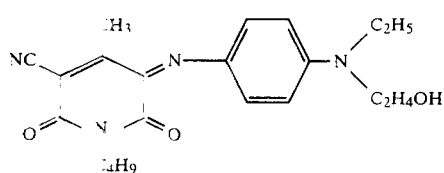
(103)

1.03 g of 1-butyl-3-cyano-6-hydroxy-4-methylpyrid-2-one in 15 ml of 1 M aqueous sodium hydroxide solution was treated with 10 ml of 1 M 4-amino-N-ethyl-N-(β-hydroxyethyl)-aniline and 20 ml of 1 M aqueous solution of ammonium persulphate. The mixture was stirred 10 minutes filtered and the precipitate washed with water. The product was recrystallised from ethanol.

λ max at 585 and 635 nm; sideband at 410 nm.

EXAMPLE 4

Preparation of the dye of the formula

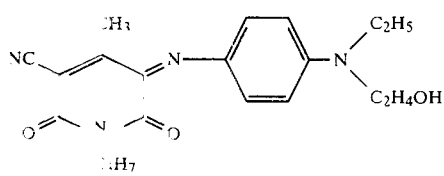
(104)

The same procedure was used as in Example 1 but 1-butyl-3-cyano-6-hydroxy-4-methyl-pyrid-2-one was replaced by the 1-propyl derivative and the developer used was 4-amino-N-ethyl-N-(β-hydroxyethyl)aniline.

λ max at 535 nm. Side-band at 405 nm.

EXAMPLE 5

Preparation of the dye of the formula

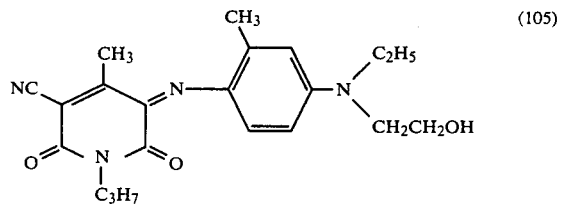
(105)

The same procedure was used as in Example 4 but the colour developer used was 4-amino-3-methyl-N-ethyl-N(p-hydroxyethyl)aniline instead of 4-amino-N-ethyl-N-(β-hydroxyethyl)aniline.

λ max at 645 nm; side-band at 405 nm.

EXAMPLE 6

Preparation of the dye of formula

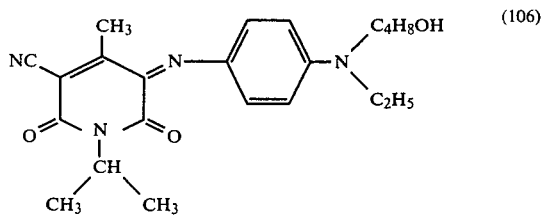
(106)

The same procedure was used as in Example 1 but 1-butyl-3-cyano-6-hydroxy-4-methyl-pyrid-2-one was replaced by the 1-iso-propyl derivative and the developer used was 4-amino-N-ethyl-N(δ-hydroxy-butyl)aniline.

λ max at 590 nm; side-band at 414 nm.

EXAMPLE 7

Preparation of the dye of formula

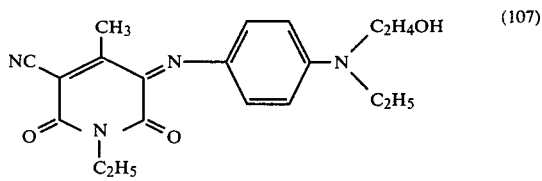
(107)

The same procedure was used as in Example 4 but 1-ethyl-3-cyano-6-hydroxy-4-methyl-pyrid-2-one was used instead of the 1-propyl derivative.

λ max at 589 nm; side-band at 408 nm.

EXAMPLE 8

In this Example the dyes of Examples 1 to 7 were coated in a layer on to photographic base material and tested for substantivity and for bleachability.

Dyed coated gelatin layers were prepared as follows:
Stock Solutions
6% Gelatin:
  Gelatin: 6 g Distilled water: 94 ml
Swell at room temperature for 30 minutes and then dissolve at 60° C.
Adjust to 40° C.
Dyestuff: $25.10^{-3}$ molar
Dissolve 0.25 mMol of the dyestuff in 10 ml of water or 2-ethoxy-ethanol. Adjust solution to 40° C.
Hardener: 1%
Dissolve 100 mg of the hardener dichlorotriazine in 10 ml water. Adjust solution to 40° C.
Wetting agent: 4% alkylsulfosuccinate or 8% sodium salt of alkylnaphthalene sulfonic acid
Coating Solution:
  Gelatin stock solution: 3.5 ml
  Distilled water: 5.0 ml
  Wetting agent: 0.25 ml
  Dyestuff: 0.232 ml
  Hardener: 1.0 ml
Coat at 40° C. on plates affixed with triacetate base, and allow to set for 5 minutes on a cold plate ($\simeq 10°$ C.). Dry at room temperature.
  Gel coating weight: 91.3 mg/dm$^2$
  mMol Dye/100 g gel: 2.76
  Dye coating weight: 0.0025 mMol/dm$^2$
Six samples were prepared using dyes of Examples 1 to 6. Dyed coated resin layers were prepared as follows:
Dye: 0.25 mM in 10 ethoxyethanol
Resin: 5% solution by weight solution of methylmethacrylate-methacrylic acid copolymer in ethanol/toluene (95:5 by volume).
A mixture of 0.278 ml dye solution, 1.722 ml resin solution and 0.5 ml ethanol was coated on a "subbed 2/1000" polyester base (6.5×23 cm).
Five samples were prepared using dyes of Examples 1 to 5.
Oil dispersions were prepared as follows: A concentrated solution of the dye in oil was dispersed in gelatin.
  Dye/oil solution: 10 g
  10% gelatin: 80 g
  10% sodium salt of alkylnaphthalene sulfonic acid: 20 g
A coating solution was made by diluting the dispersion with 10% gelatin solution and water to a final concentration of 3%. A triazine hardener was added at the rate 130 mmole hardener per gram gelatin.
Coatings were made on a triacetate base and incubated 16 hours at 40° C. and 56% RH (relative humidity).
Four samples were prepared from the dye of Example 7.
Substantivity Measurement
A 5 cm$^2$ disc was cut and the visible spectrum measured. The disc was soaked in water (7.5 ml) for 30 minutes. The disc was allowed to dry and the specimen measured again.

$$\text{Substantivity} = \frac{D \text{ max of soaked disc} \times 100}{D \text{ max of unsoaked disc}}$$

Bleachability Measurement
For simple gelatin and resin coatings:
A strip (2.54×7.62 cm) was immersed 2.5 minutes in developer, 2 minutes in fixer and washed 10 minutes in water before drying.
The developer solution comprised per liter aqueous solution 2 g of N-methyl-p-aminophenol sulfate, 75 g of anhydrous sodium sulphiate, 8 g of hydroquinone, 37.5 g of anhydrous sodium carbonate and 2 g of potassium bromide. The fixer consisted 82 g of ammonium thiosulphate per liter aqueous solution. For oil dispersed gelatin coatings:
A strip (2.54×7.62 cm) was immersed 3.25 minutes in developer, 6.5 minutes in bleach, and washed 3.25 minutes in water; all operations at a temperature of 37.8° C. The strip was immersed 6.5 minutes in fixer, washed 3.25 minutes in water and treated with stabiliser for 1.5 minutes before drying.
The developer solution comprised per liter aqueous solution 4.75 g of 4-amino-3-methyl-N-ethyl-N-hydroxyethylanilino hydrogen sulfate, 4.25 g of anhydrous sodium sulphite, 3.75 g of anhydrous potassium carbonate, 2 mg of potassium iodide, 1.3 g of sodium bromide, 2 g of hydroxylamine sulphate and 2.5 g of sodium hexametaphosphate. The bleach consisted of 150 g of ammonium bromide, 35 g of sodium nitrate, 1.56 M (1/5 ml) of ferric ammonium ethylenediaminetetraacetate, and 10.5 ml of acetic acid per liter solution. The fixer consisted of 162 ml of an aqueous 50% solution of ammonium thiosulphate, 1.25 g of ethylenedinitrilotetraacetic acid disodium salt, 12.4 g of anhydrous sodium bisulphite, and 2.4 g of sodium hydroxide per liter water. The stabiliser comprised 5 ml of an aqueous formaldehyde solution (37%) and 0.8 ml of a wetting agent per liter solution.

$$\text{Bleachability} = 100 \left(1 - \frac{D \text{ max of bleached strip}}{D \text{ max of unbleached strip}}\right)$$

The following results were obtained:

| Coating | Dye (formula) | Light absorption in layer (nm) | Substantivity % | Bleachability % |
|---|---|---|---|---|
| Gelatin | 101 | 450/600 | 80 | 98 |
| " | 103 | 472 | 100 | 100 |
| " | 104 | 475/585 | 100 | 97 |
| " | 105 | 430/592 | 35 | 96 |
| " | 106 | 400–700 | 100 | 100 |
| Resin | 101 | 600–680 | 100 | 100 |
| " | 102 | 645 | 100 | 96 |
| " | 103 | 580 | 100 | 100 |
| " | 104 | 580 | 100 | 100 |
| " | 105 | 405/586 | 100 | 93 |
| Oil(Reofos 65, Trademark) | | | | |
| | 107 | 590 | 89 | 94 |
| Oil(ditert-pentylphenol) | | | | |
| | 107 | 666 | 92 | 88 |
| Oil(n-butyl-acetanilide) | | | | |
| | 107 | 586 | 76 | 52 |
| Oil(diethyl-lauramide) | | | | |
| | 107 | 583 | 84 | 87 |

We claim:
1. Light-sensitive photographic material which comprises in at least one layer thereof a dyestuff of the general formula

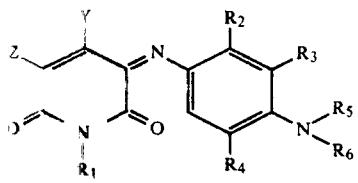

wherein $R_1$ is hydrogen, alkyl of 1 to 6 carbon atoms, hydroxyalkyl of 1 to 6 carbon atoms, alkoxyalkyl of 1 to 6 carbon atoms each in the alkyl and the alkoxy radical, phenyl, benzyl, β-phenylethyl or cyclohexyl, $R_2$ is hydrogen, chloro, alkyl, hydroxyalkyl or alkoxy each of 1 to 6 carbon atoms, $R_3$ is hydrogen, alkyl or alkoxy of 1 to 6 carbon atoms, $R_4$ is hydrogen or alkyl of 1 to 6 carbon atoms, $R_5$ and $R_6$ are hydrogen, alkyl or hydroxyalkyl of 1 to 6 carbon atoms, alkoxyalkyl of 1 to 6 carbon atoms each in the alkyl and the alkoxy radical, carboxyalkyl with 1 to 3 carbon atoms in the alkyl radical, β-methylsulphonamidoethyl or sulpho-n-butyl, $R_5$ and $R_6$ and the nitrogen atom to which they are attached are piperidine, morpholine, piperazine or pyrrolidine, Y is hydrogen, alkyl of 1 to 6 carbon atoms, hydroxy, $-COOR_{11}$ or $-COONR_{11}R_{12}$ and Z is $-CN$, $-COOR_{11}$ or $-CONR_{11}R_{12}$, wherein $R_{11}$ and $R_{12}$ are hydrogen or alkyl of 1 to 3 carbon atoms.

2. Light-sensitive photographic material according to claim 1 wherein the layer which contains the dye is a resin backing layer on the reverse side to the photosensitive layer.

3. Light-sensitive material according to claim 2 wherein the dye is of the formula

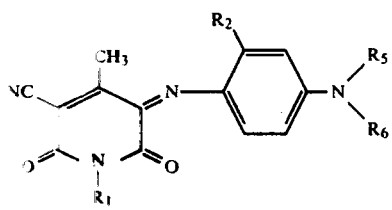

wherein $R_1$ is alkyl of 1 to 6 carbon atoms, $R_2$ is hydrogen or alkyl of 1 to 3 carbon atoms and $R_5$ and $R_6$ are alkyl of 1 to 4 carbon atoms, hydroxyalkyl of 2 to 4 carbon atoms or $R_5$ and $R_6$ together with the nitrogen atom to which they are attached are a piperidine, morpholine, piperazine or pyrrolidine ring.

4. Light-sensitive photographic material according to claim 3 wherein the dye corresponds to the formula

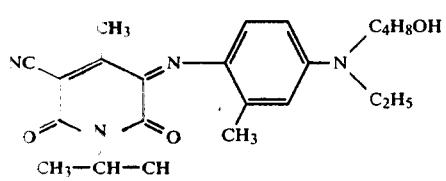

5. Light-sensitive photographic material according to claim 1 wherein the layer which contains the dye is an anti-halation underlayer.

6. Light-sensitive photographic material according to claim 5 wherein the dye corresponds to the formula

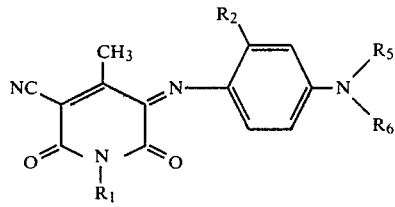

wherein $R_1$ is alkyl of 1 to 6 carbon atoms, $R_2$ is hydrogen or alkyl of 1 to 3 carbon atoms and $R_5$ and $R_6$ are alkyl of 1 to 4 carbon atoms, hydroxyalkyl of 2 to 4 carbon atoms or $R_5$ and $R_6$ together with the nitrogen atom to which they are attached are a piperidine, morpholine, piperazine or pyrrolidine ring.

7. Light-sensitive photographic material according to claim 6 wherein the dye corresponds to the formula

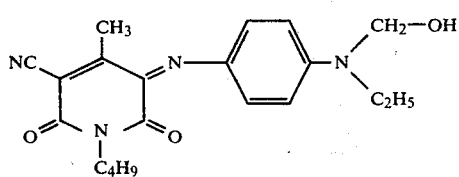

8. Light-sensitive photographic material according to claim 1 wherein the layer which contains the dye is a colloid filter layer between light-sensitive layers.

9. Light-sensitive photographic material according to claim 8 wherein the dye is present as an oil dispersion.

10. Light-sensitive photographic material according to claim 8, wherein the dye corresponds to the formula

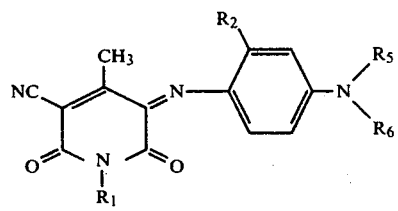

wherein $R_1$ is alkyl of 1 to 6 carbon atoms, $R_2$ is hydrogen or alkyl of 1 to 3 carbon atoms and $R_5$ and $R_6$ are alkyl of 1 to 4 carbon atoms, hydroxyalkyl of 2 to 4 carbon atoms or $R_5$ and $R_6$ together with the nitrogen atom to which they are attached are a piperidine, morpholine, piperazine or pyrrolidine ring.

11. Light-sensitive photographic material according to claim 10 wherein the dye corresponds to the formula

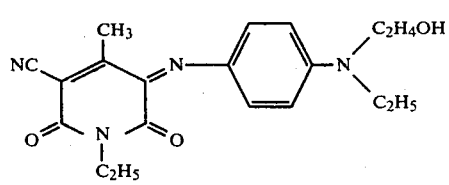

* * * * *

UNITED STATES PATENT AND TRADEMARK OFFICE
CERTIFICATE OF CORRECTION

PATENT NO. : 4,233,399
DATED : November 11, 1980
INVENTOR(S) : Rainer Kitzing, et al.

It is certified that error appears in the above—identified patent and that said Letters Patent is hereby corrected as shown below:

Column 10, line 19 "1/5" should be --175--.

Signed and Sealed this

Third Day of March 1981

[SEAL]

Attest:

RENE D. TEGTMEYER

Attesting Officer     Acting Commissioner of Patents and Trademarks